United States Patent
Strayer et al.

(10) Patent No.: US 6,975,493 B2
(45) Date of Patent: Dec. 13, 2005

(54) OVERVOLTAGE TRANSIENT PROTECTION FOR LOW SIDE CIRCUITS

(75) Inventors: Lance R. Strayer, Clarkston, MI (US); Lawrence D. Hazelton, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 422 days.

(21) Appl. No.: 10/355,354

(22) Filed: Jan. 31, 2003

(65) Prior Publication Data

US 2004/0150929 A1 Aug. 5, 2004

(51) Int. Cl.$^7$ ............................................... H02H 9/00
(52) U.S. Cl. ....................................... 361/56; 361/91.1
(58) Field of Search .................. 361/56, 91.1; 307/9.1, 307/10.3; 327/309

(56) References Cited

U.S. PATENT DOCUMENTS

| | | | | |
|---|---|---|---|---|
| 4,005,342 A | * | 1/1977 | Davis | 361/56 |
| 4,890,020 A | * | 12/1989 | Bird | 327/429 |
| 6,043,965 A | | 3/2000 | Hazelton et al. | 361/84 |
| 6,154,081 A | | 11/2000 | Pakkala et al. | 327/309 |
| 6,198,350 B1 | | 3/2001 | Zarabadi | 330/297 |
| 6,204,715 B1 | | 3/2001 | Sellnau et al. | 327/309 |
| 6,392,266 B1 | | 5/2002 | Robb et al. | 257/314 |

* cited by examiner

*Primary Examiner*—Stephen W. Jackson
*Assistant Examiner*—Boris Benenson

(57) ABSTRACT

A low side overvoltage protection circuit configuration comprising: a first switching device in operable communication with and disposed between a ground and a protected ground; a load in operable communication with and disposed between a voltage source and the protected ground; a control circuit configured to control the first switching device in operable communication with a transient protected voltage source. The first switching device is configured to provide electrical circuit isolation of the protected ground from the ground. Also, a method for providing a low side circuit overvoltage protection comprising: detecting an overvoltage transient on a voltage source; isolating a protected ground from a circuit ground with a first switching device; and controlling the first switching device with a control circuit in operable communication with transient protected voltage source. The control circuit is responsive to an overvoltage transient of the voltage source.

21 Claims, 3 Drawing Sheets

OVERVOLTAGE TRANSIENT PROTECTION FOR LOW SIDE CIRCUITS

BACKGROUND

This invention relates to providing overvoltage protection for circuits and systems. For example, circuits in vehicle systems subject to overvoltage conditions resultant from load removal and the like or where integrated circuit microcontrollers are interfaced with motors via MOSFET(s) for motor position controllers such as may be employed in vehicle steering systems. Such systems may use control electronics to provide the interface between low voltage microcontrollers and the high voltage MOSFETs. The control electronics may also include motor control logic, a charge pump, MOSFET gate drives and overvoltage and overcurrent protection.

Unfortunately, many electronic systems include components that can be susceptible to voltage transients on their supply voltage. Such transients in certain circumstances may even destroy the components leading to early failure and excessive repairs. Therefore many circuits employ over voltage and/or over current protection schemes to prevent or avoid such transients or at least avoid the damage resulting from their occurrence.

A typical method to protect such electronics modules from transients and reverse voltage would be to use transient suppression devices to limit the voltage below the maximum input voltages for the devices. Unfortunately, if there were a great amount of energy in the transient pulse, the clamping devices would be very large and expensive. Moreover, reasonably sized varistors and the like would not be able to withstand the high peak currents seen during some transients. Transient voltage suppressors that can withstand the peak power are available but are large and expensive.

Therefore, it would be beneficial to provide a cost effective means of protecting circuits from over voltage transients.

BRIEF SUMMARY

Disclosed herein is a low side overvoltage protection circuit configuration comprising: a first switching device in operable communication with and disposed between a ground and a protected ground; a load in operable communication with and disposed between a voltage source and the protected ground; a control circuit configured to control the first switching device in operable communication with a transient protected voltage source. The first switching device is configured to provide electrical circuit isolation of the protected ground from the ground.

Also disclosed herein is a method for providing a low side circuit overvoltage protection comprising: detecting an overvoltage transient on a voltage source; isolating a protected ground from a circuit ground with a first switching device; and controlling the first switching device with a control circuit in operable communication with another transient protected voltage source. The control circuit is responsive to an overvoltage transient of the voltage source.

Further disclosed herein is a system for providing a low side circuit overvoltage protection comprising: a means for detecting an overvoltage transient on a voltage source; a means for isolating a protected ground from a circuit ground with a first switching device; and a means for controlling the first switching device with a control circuit in operable communication with another transient protected voltage source. The control circuit is responsive to an overvoltage transient of the voltage source.

Also disclosed herein in yet another embodiment is a vehicle steering system with a low side overvoltage protection circuit configuration comprising: a steerable wheel; a steering mechanism operably connected to the steerable wheel for transmitting a desired steering command to the steerable wheel; a steering input device in operable communication with the steering mechanism configured to generate the desired steering command; and a motor in operable communication with the steering mechanism to provide a torque and in operable communication with a transient protected voltage source. The system also includes a first switching device in operable communication with and disposed between a ground and a protected ground; a load in operable communication with and disposed between a voltage source and the protected ground, the load including the motor; and a control circuit configured to control the first switching device in operable communication with a transient protected voltage source. The first switching device is configured to provide electrical circuit isolation of the protected ground from the ground.

BRIEF DESCRIPTION OF THE DRAWINGS

The present invention will now be described, by way of an example, with references to the accompanying drawings, wherein like elements are numbered alike in the several figures in which.

DESCRIPTION OF AN EXEMPLARY EMBODIMENT

Figure 1:
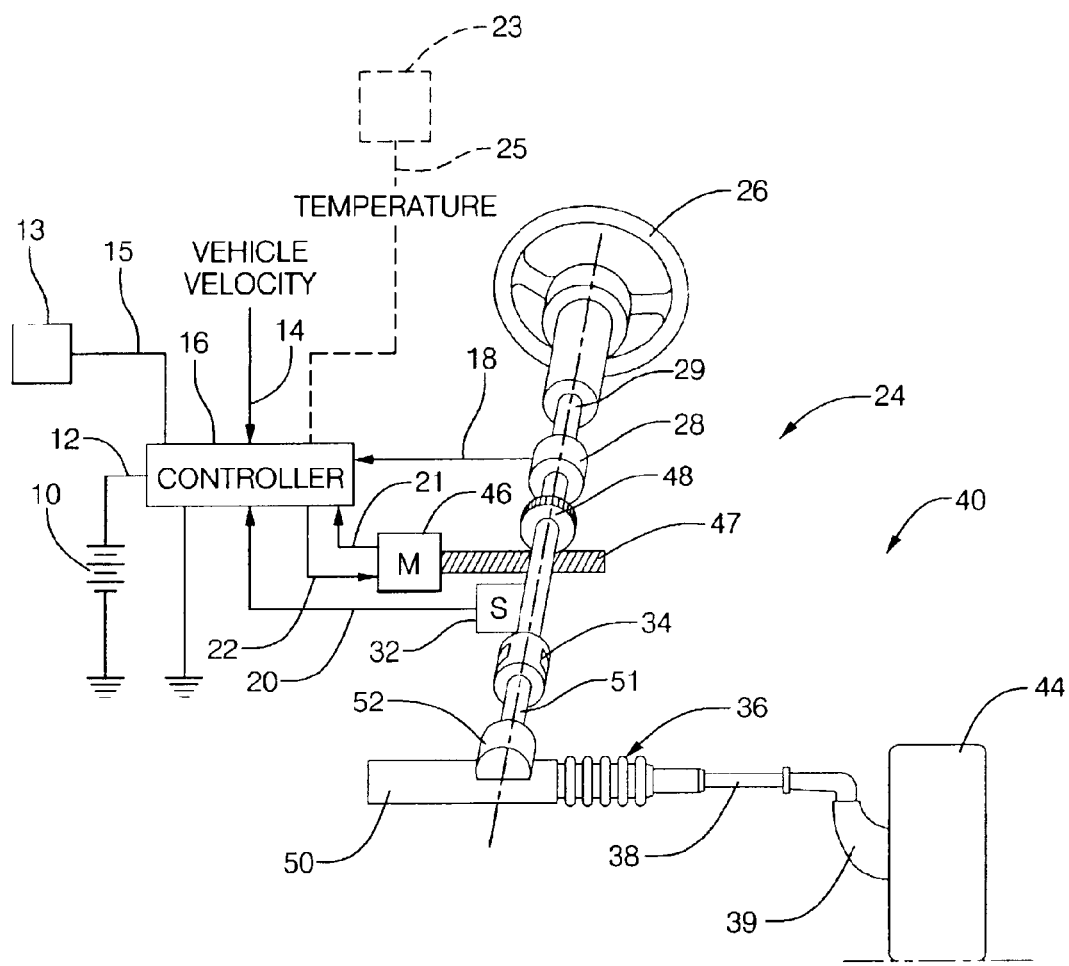
FIG. 1 depicts a simplified block diagram of a power steering system employing an exemplary embodiment.

Referring to FIG. 1, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and the electric motor 46. The controller 16 is powered by the vehicle power supply 10 through line 12. The controller 16 receives a vehicle speed signal 14 representative of the vehicle velocity. Steering pinion gear angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any instance where rotational displacement, e.g., torque sensing is desired. Moreover, the references and descriptions herein may apply to many forms of parameter sensors, including, but not limited to torque, position, speed and the like. It should also be noted that reference herein to electric machines including, but not limited to, motors, or more specifically sinusoidally excited brushless DC motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown) such that, when applied to the motor 46, the desired torque or position is generated. Because these voltages are related to the position and speed of the motor 46 and the desired torque, the position and/or speed of the rotor and the torque applied by an operator are determined. A position encoder is connected to the steering shaft 51 to detect the angular position 0. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. An exemplary embodiment includes such a torque sensor 28 and the torque signal(s) 18 therefrom, as may be responsive to a compliant torsion bar, T-bar, spring, or similar apparatus (not shown) configured to provide a response indicative of the torque applied.

Optionally, a temperature sensor(s) 23 located at the torque sensor 28. Preferably the temperature sensor 23 is configured to directly measure the temperature of the sensing portion of the torque sensor 28. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the abovementioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., control algorithm(s), and the like), controller 16 may include, but not be limited to, a processor(s), computer(s), DSP(s), microcontrollers, memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

In an exemplary embodiment, the controller 16 obtains as input signals or receives signals to facilitate computing, commands for controlling a motor. Also received by the controller 16 are a variety of implementation specific parameters, signals and values for initialization and characterization of the prescribed processes and to identify various states of the processes herein.

Figure 2:
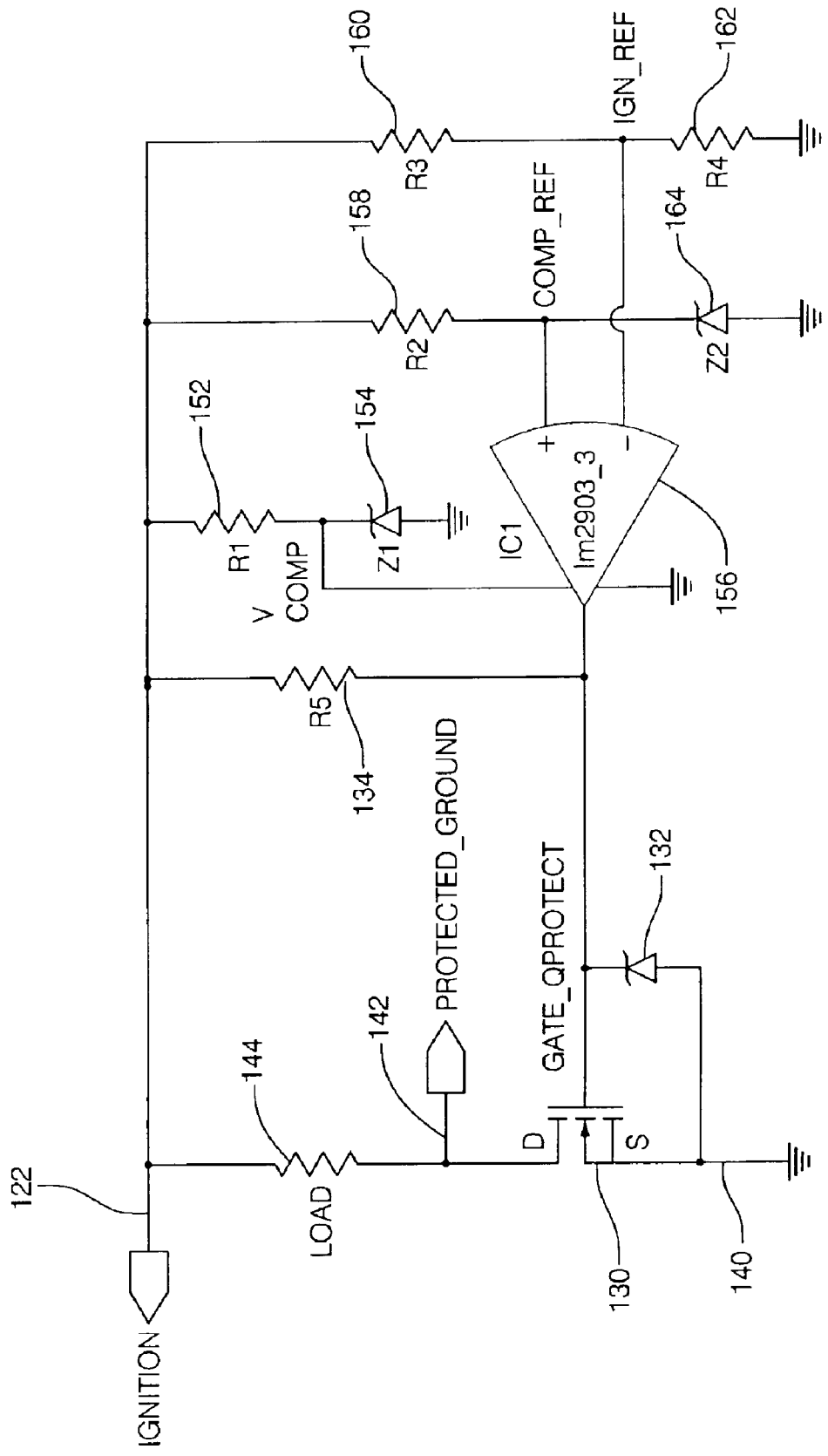
FIG. 2 is a simplified schematic of a first embodiment to provide over-voltage protection.

Continuing now with FIG. 2, a simplified circuit for providing overvoltage protection for circuits and systems is depicted. In particular, vehicle systems subject to overvoltage conditions resultant from load interruptions, and the like.

Referring to FIG. 2, the load 144 represents the sum of electronics that require protection from overvoltage transients and conditions. Overvoltage protection to a circuit or module can be provided by adding a switching device 130 e.g., switch, relay, transistor, MOSFET, SCR, and the like, as well as combinations including at least one of the foregoing, hereinafter denoted as switching device 130 and depicted in the figure as a MOSFET between a circuit ground 140 (reference voltage or potential) and the selected electronics, loads and the like that require overvoltage protection denoted in the figure as protected ground 142. In an exemplary embodiment, the source of the switching device 130 (in this instance an n-channel MOSFET) may be connected to ground 140 while the drain would be connected to the low side of the electronics to be protected at protected ground 142. The gate of the switching device 130 is then controlled in a manner to ensure that the device is normally turned "on" and thereby connecting the rest of the protected ground 142 to ground 140 through the switching device 130. Likewise, of course, the switching device 130 may then be configured to be switched "off" if the voltage supply also denoted herein Ignition 122 exceeds a selected overvoltage threshold.

Continuing with FIG. 2 an exemplary implementation of the low side protection and control is depicted. Switching device 130 acts as the switch to ground to protect the loads requiring overvoltage protection e.g., sensitive electronics, (denoted "Load" 144 on the figure) from overvoltage transients and conditions. A zener diode 132 limits the gate to source voltage on switching device 130 (12 Volts in this example) to prevent damage to the switching device. Resistor 134 provides a high voltage source to the gate of switching device 130 when Ignition is above the Vgs(on) threshold of switching device 130. This ensures that the switching device 130 (in this instance a MOSFET) turns on and thereby provides a conduction path to ground 140 for the circuits, devices, and the like on protected ground 142 under normal operating conditions.

Continuing with the figure, resistor 152 also denoted R1 and zener diode 154 also denoted Z1 provide an overvoltage and reverse voltage protected supply voltage to control circuit 156 in this instance a comparator also denoted IC1. IC1 will be exposed to the full overvoltage condition as presented on voltage supply Ignition 122. The combination of control circuit IC1 156, resistor 158, also denoted R2, resistor 160 also denoted R3, resistor 162 also denoted R4 and zener diode 164 also denoted Z2 cooperated to form an overvoltage detection circuit.

Continuing now with a discussion of the overvoltage detection circuit and the low side overvoltage protection provided, resistor 158 (R2) and zener diode 164 (Z2) in series, form a reference voltage to the control circuit 156 (comparator IC1). In an exemplary embodiment, the breakdown voltage of zener diode 164 (Z2) is selected to be a voltage less than the normal operating voltage of voltage source Ignition 122 (for example 2.4 Volts for a voltage source of 12 volts). This voltage establishes a reference voltage for the control circuit 156. Resistor 158 (R2) is used to limit the current through zener diode 164 (Z2) and maintain power dissipation within acceptable limits. Resistor 160 (R3) and resistor 162 (R4) form a voltage divider on voltage source 122 (Ignition) to establish an overvoltage threshold (36.7 Volts on voltage source 122 (Ignition) in this example).

The control circuit 156, voltage comparator (IC1) monitors the two voltage levels formulated above. When the voltage on the non-inverting input denoted Comp_ref is above the voltage on the inverting input denoted Ign_ref in the figure, the output of control circuit 156 will be "high" or "open collector." In this instance a voltage defined by the series combination of resistor 134 (R5) and zener diode 132 is applied as a control to switching device 130. Conversely, when the voltage on the non-inverting input to control circuit 156 (Comp_ref) is less than the voltage on the inverting input (Ign_ref), the output will be approximately ground or "low". In this instance a low is supplied to the gate of switching device 130 (a MOSFET in this instance). When the gate of the switching device 130 is pulled to ground, the switching device 130 (MOSFET) turns off isolating the Protected Ground 142 from ground 140.

To provide protection to the Load 144 the path to ground 140 for the "Load" 144 is broken whenever the voltage source 122 (Ignition) exceeds the selected overvoltage threshold as established by zener diode 164 (Z2). It will be appreciated that the switching device 130 is selected with a voltage rating exceeding the maximum overvoltage of voltage source 122 (Ignition).

It will also be appreciated that the exemplary embodiment depicted in FIG. 2 is most advantageous if a spare control circuit 156 (in this instance a voltage comparator with protected supply voltage) is already available in an existing the circuit. However, should this not be the case, or if additional components would be necessary another implementation may be beneficial.

Figure 3:
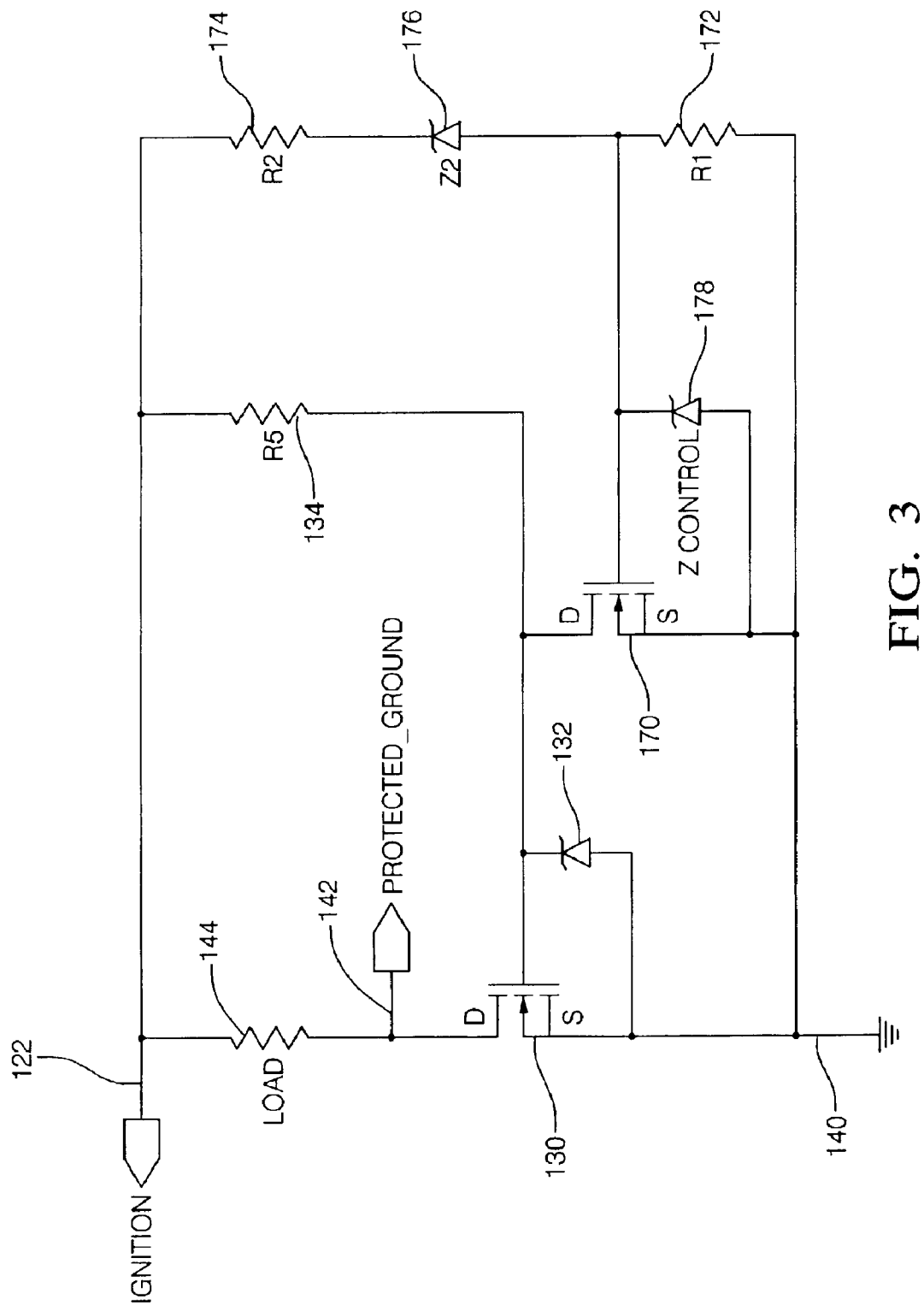
FIG. 3 is a simplified schematic of a second embodiment to provide over-voltage protection.

FIG. 3 depicts an alternative embodiment for a circuit configuration employing fewer, less expensive, discrete components. In this embodiment, the switching device 130 (MOSFET), zener diode 132 and resistor 134 perform exactly as described above. A second switching device 170 e.g., switch, relay, transistor, MOSFET, SCR, and the like, as well as combinations including at least one of the foregoing, hereinafter denoted as switching device 170 and depicted in the figure as a MOSFET is employed to control the voltage applied to the gate (control) of switching device 130. The second switching device 170 in combination with a resistor 172 also denoted R1, a resistor 174 also denoted R2, a zener diode 176 also denoted Z2 and a zener diode 178 also Zcontrol operate as the overvoltage detection circuit similar to that described above.

In an exemplary embodiment, under normal operating conditions, switching device 170 is turned "off" by R1 maintaining the gate of switching device 170 at the ground potential or at least less than the Vgs(on) of switching device 170 (in this instance, an n-channel MOSFET). The zener voltage of zener diode 176 (Z2) controls the selected overvoltage threshold in this embodiment. The zener diode 176 (Z2) is selected to ensure that it only allows current to flow through when voltage source 122 (Ignition) exceeds the selected (36 Volts in this example). Resistor 174 (R2) limits the current through Z2 during these overvoltage conditions. Zener diode 178 (Zcontrol) is selected to limit the maximum attainable gate to source voltage of for the switching device 170. When the voltage source 122 Ignition exceeds the zener voltage of zener diode 176 (Z2), current flows producing a voltage at the gate of switching device 170 When this voltage exceeds the Vgs(on) turn on voltage of switching device 170, switching device 170 turns "on" pulling the gate of switching device 130 to ground and thereby turning switching device 130 "off." The Protected_Ground is then isolated from ground as described above.

Once again, it will be appreciated that the switching device 130 is the only component that requires a high voltage rating to ensure it can withstand the overvoltage levels of voltage source 122 (Ignition). Advantageously, the voltage rating of switching device 170 is determined by the selected breakdown voltage of zener diode 132, which is relatively low voltage facilitating the component selection.

Yet, another advantage of the disclosed embodiments over existing options may readily be apparent from consideration thereof. One means of providing protection to the circuitry from these high transient voltages to limit or clamp the input voltage for Ignition 122 to below the maximum input voltages for the circuit components such as, the predriver and the like, would be to employ transient suppression devices including, but not limited to transorbs, varistors, zener diodes, and the like, as well as combinations including at least one of the foregoing. Unfortunately, in such a configuration, there is often a great amount of energy in a transient pulse so the requisite clamping devices would be very large and expensive. Reasonably sized varistors, for example, would not be able to withstand the high peak currents experienced during such transients. Transient voltage suppressors that could withstand the peak power generated are available, but are large and expensive.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A low side overvoltage protection circuit configuration comprising:
   a first switching device in operable communication with and disposed between a ground and a protected ground;
   a load in operable communication with and disposed between a voltage source and said protected ground;
   a control circuit configured to control said first switching device in operable communication with a transient protected voltage source; and
   wherein said first switching device is configured to provide electrical circuit isolation of said protected ground from said ground.

2. The circuit configuration of claim 1 wherein said transient protected voltage source comprises a resistor in series with a zener diode, said resistor in operable communication with said voltage source and said zener diode also in communication with said ground.

3. The circuit configuration of claim 1 wherein said first switching device is a n-channel MOSFET arranged with a drain thereof operably connected to said protected ground, a source thereof operably connected to said ground, and a gate thereof in operable communication with said control circuit and a pull up resistor in operable communication with said voltage source.

4. The circuit configuration of claim 3 further including a zener diode disposed from said gate of said n-channel MOSFET to said source thereof.

5. The circuit configuration of claim 1 wherein said control circuit comprises a comparator operably connected to a reference voltage source and another voltage source based on said voltage source.

6. The circuit configuration of claim 5 wherein said comparator provides a command of substantially ground to said first switching device if said voltage source exceeds a selected threshold.

7. The circuit configuration of claim 5 wherein said reference voltage source comprises a zener diode in series with a resistor, said resistor also in operable communication with said voltage source and said zener diode also in communication with said ground.

8. The circuit configuration of claim 5 wherein said voltage source comprises a series combination of a plurality of resistors, a first resistor of said plurality of resistors also in operable communication with said voltage source and second resister of said plurality of resistors also in communication with said ground.

9. The circuit configuration of claim 1 wherein said control circuit comprises a second switching device operably connected to a second voltage source responsive said voltage source exceeding a selected threshold.

10. The circuit configuration of claim 9 wherein said second switching device is a n-channel MOSFET arranged with a drain thereof operably connected to a gate of said first switching device and a source thereof operably connected to said ground, and a gate thereof in operable communication with said second voltage source.

11. The circuit configuration of claim 9 wherein said second switching device provides a command of substantially ground to said first switching device if said voltage source exceeds a selected threshold.

12. The circuit configuration of claim 9 wherein said second voltage source comprises a resistor in series with a zener diode in series with another resistor, said another resistor also in operable communication with and disposed from a gate of said second switching device to a source thereof and said ground.

13. The circuit configuration of claim 9 wherein said voltage source comprises a series combination of a plurality of resistors, a first resistor of said plurality of resistors also in operable communication with said voltage source and a second resister of said plurality of resistors also in communication with said ground.

14. A method for providing a low side circuit overvoltage protection comprising:
   detecting an overvoltage transient on a voltage source;
   isolating a protected ground from a circuit ground with a first switching device; and
   controlling said first switching device with a control circuit in operable communication with another transient protected voltage source; said control circuit responsive to an overvoltage transient of said voltage source.

15. The method of claim 14 wherein said another transient protected voltage source comprises a resistor in series with a zener diode.

16. The method of claim 14 wherein said isolating comprises providing a substantially open circuit between said protected ground and said circuit ground.

17. The method of claim 14 wherein said first switching device is an n-channel MOSFET arranged with a drain thereof operably connected to said protected ground and a source thereof operably connected to said circuit ground.

18. The method of claim 14 wherein said controlling comprises commanding said first switching device to an off state for said overvoltage transient of said voltage source.

19. The method of claim 14 further including a load in operable communication with, disposed between said voltage source, and said protected ground.

20. A system for providing a low side circuit overvoltage protection comprising:
   a means for detecting an overvoltage transient on a voltage source;
   a means for isolating a protected ground from a circuit ground with a first switching device; and
   a means for controlling said first switching device with a control circuit in operable communication with a transient protected voltage source; said control circuit responsive to an overvoltage transient of said voltage source.

21. A vehicle steering system with a low side overvoltage protection circuit configuration comprising:

a steerable wheel;

a steering mechanism operably connected to said steerable wheel for transmitting a desired steering command to said steerable;

a steering input device in operable communication with said steering mechanism configured to generate said desired steering command;

a motor in operable communication with said steering mechanism to provide a torque and in operable communication with a transient protected voltage source;

a first switching device in operable communication with and disposed between a ground and a protected ground;

a load in operable communication with and disposed between a voltage source and said protected ground, said load including said motor;

a control circuit configured to control said first switching device in operable communication with a transient protected voltage source; and wherein said first switching device is configured to provide electrical circuit isolation of said protected ground from said ground.

* * * * *